United States Patent
Griffin et al.

(10) Patent No.: US 12,524,369 B2
(45) Date of Patent: Jan. 13, 2026

(54) PERFORMING AUTOMATIC QUBIT RELOCATION

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 1092 days.

(21) Appl. No.: 16/995,269

(22) Filed: Aug. 17, 2020

(65) Prior Publication Data

US 2022/0051121 A1    Feb. 17, 2022

(51) Int. Cl.
*G06F 15/16* (2006.01)
*G06N 10/20* (2022.01)

(52) U.S. Cl.
CPC ............. *G06F 15/16* (2013.01); *G06N 10/20* (2022.01)

(58) Field of Classification Search
CPC ................................ G06N 10/20; G06F 15/16
See application file for complete search history.

(56) References Cited

U.S. PATENT DOCUMENTS

| | | | |
|---|---|---|---|
| 7,234,073 B1 * | 6/2007 | Roytman | G06F 11/2025 714/E11.073 |
| 7,451,292 B2 | 11/2008 | Routt | |
| 9,274,898 B2 | 3/2016 | Boldyrev et al. | |
| 2018/0062764 A1 | 3/2018 | Borrill | |
| 2018/0114138 A1 | 4/2018 | Monroe et al. | |
| 2019/0042966 A1 * | 2/2019 | Hogaboam | G06F 12/1027 |
| 2021/0182096 A1 * | 6/2021 | Walker | G06N 10/70 |
| 2021/0374594 A1 * | 12/2021 | Langer | G06F 8/41 |
| 2022/0269976 A1 * | 8/2022 | Wang | G06N 10/00 |

OTHER PUBLICATIONS

Monroe, Christopher R., Robert J. Schoelkopf, and Mikhail D. Lukin. "Quantum connections." Scientific American 314.5 (2016): 50-57. (Year: 2016).*

Wikipedia. Quantum Teleportation. Article version from Jun. 29, 2020. https://en.wikipedia.org/w/index.php?title=Quantum_teleportation &oldid=965043828. Accessed Aug. 1, 2023. (Year: 2020).*

(Continued)

*Primary Examiner* — Markus A. Vasquez
(74) *Attorney, Agent, or Firm* — Dority & Manning, P.A.

(57) ABSTRACT

Performing automatic qubit relocation is disclosed herein. A processor device of a first quantum computing device receives a system stress indicator from a system monitor that tracks a status of the first quantum computing device and/or a status of qubits maintained by the first quantum computing device. A relocation rule is applied to the system stress indicator to determine whether one or more qubits located at the first quantum computing device are to be relocated. If so, the one or more qubits are relocated from the first quantum computing device to a second quantum computing device (e.g., by physically transporting the qubits via a quantum channel, or by teleporting the qubits using pairs of entangled qubits, as non-limiting examples). The processor device also updates qubit registry records for the one or more qubits to indicate that the one or more qubits have been relocated.

18 Claims, 7 Drawing Sheets

(56) References Cited

OTHER PUBLICATIONS

Author Unknown, "The No-Cloning Theorem," Keio University, Available online at: https://www.futurelearn.com/courses/intro-to-quantum-computing/0/steps/31562, Feb. 2015, 13 pages.

Choi, C. Q., "A Data Bus for Quantum Computers," IEEE Spectrum, Available online at: https://spectrum.ieee.org/tech-talk/computing/hardware/a-quantum-bus-for-quantum-computers, Nov. 9, 2017, 2 pages.

Sillanpää, M. A., et al., "Coherent Quantum State Storage and Transfer Between Two Phase Qubits via a Resonant Cavity," Nature Letters, vol. 449, Sep. 27, 2007, 5 pages.

* cited by examiner

QUBIT RELOCATION SERVICE 70

| RELOCATION RULE 72(0) | | | |
|---|---|---|---|
| RULE RANK 74(0) | SYSTEM ATTRIBUTE 76(0) | RELOCATION THRESHOLD 78(0) | DESTINATION QUANTUM COMPUTING DEVICE IDENTIFIER 80(0) |

• • •

| RELOCATION RULE 72(N) | | | |
|---|---|---|---|
| RULE RANK 74(N) | SYSTEM ATTRIBUTE 76(N) | RELOCATION THRESHOLD 78(N) | DESTINATION QUANTUM COMPUTING DEVICE IDENTIFIER 80(N) |

*FIG. 2*

PERFORMING AUTOMATIC QUBIT RELOCATION

BACKGROUND

Quantum computing involves the use of quantum bits, referred to herein as "qubits," each of which has properties (such as superposition and entanglement) that differ from those of non-quantum bits used in classical computing. As quantum computing continues to increase in popularity and become more commonplace, an ability to react to adverse operating conditions that may jeopardize a quantum computing device's ability to maintain qubits will be desirable.

SUMMARY

The examples disclosed herein implement a quantum file management system that performs automatic qubit relocation. A qubit relocation service, executing on a processor device of a first quantum computing device, receives a system stress indicator from a system monitor that tracks a status of the first quantum computing device and/or a status of qubits maintained by the first quantum computing device. The system stress indicator may include, as non-limiting examples, an indication of a state of the first quantum computing device itself (e.g., system load, system response time, operating temperature, and/or the like), an indication of a state of the qubits maintained by the first quantum computing device (e.g., qubit age, coherence time, and/or the like), and/or an indication of any other condition that may adversely affect the ability of the first quantum computing device to maintain its qubits in a usable state.

The qubit relocation service applies a relocation rule to the system stress indicator to determine whether one or more qubits located at the first quantum computing device are to be relocated. As a non-limiting example, the relocation rule may specify an acceptable operating temperature for the first quantum computing device, and the qubit relocation service may apply the relocation rule to a current operating temperature indicated by the system stress indicator to determine whether the current operating temperature exceeds the acceptable operating temperature. If it is determined that the one or more qubits are to be relocated, the qubit relocation service automatically relocates the one or more qubits from the first quantum computing device to a second quantum computing device. Relocating the one or more qubits may be accomplished in some examples by physically transporting the qubits from the first quantum computing device to the second quantum computing device via a quantum channel, or by teleporting the qubits from the first quantum computing device to the second quantum computing device using pairs of entangled qubits. The qubit relocation service also updates qubit registry records for the one or more qubits to indicate that the one or more qubits have been relocated.

In another example, a method for providing automatic qubit relocation is provided. The method comprises receiving, by a processor device of a first quantum computing device, a system stress indicator from a system monitor. The method further comprises applying a relocation rule to the system stress indicator. The method also comprises determining, based on the relocation rule and the system stress indicator, that one or more qubits located at the first quantum computing device are to be relocated. The method additionally comprises, responsive to the determining, relocating the one or more qubits from the first quantum computing device to a second quantum computing device. The method further comprises updating one or more qubit registry records corresponding to the one or more qubits to indicate that the one or more qubits have been relocated to the second quantum computing device.

In another example, a quantum computing system for accessing quantum file permissions is provided. The quantum computing system includes a quantum computing device including a memory and at least one processor device coupled to the memory. The at least one processor device is to receive a system stress indicator from a system monitor. The at least one processor device is further to apply a relocation rule to the system stress indicator. The at least one processor device is also to determine, based on the relocation rule and the system stress indicator, that one or more qubits located at the first quantum computing device are to be relocated. The at least one processor device is additionally to, responsive to the determining that the relocation threshold has been met, relocate the one or more qubits from the first quantum computing device to a second quantum computing device. The at least one processor device is further to update one or more qubit registry records corresponding to the one or more qubits to indicate that the one or more qubits have been relocated to the second quantum computing device.

In another example, a non-transitory computer-readable medium is provided. The non-transitory computer-readable medium stores thereon computer-executable instructions which, when executed by a processor device, cause the processor device to receive a system stress indicator from a system monitor. The computer-executable instructions further cause the processor device to apply a relocation rule to the system stress indicator. The computer-executable instructions also cause the processor device to determine, based on the relocation rule and the system stress indicator, that one or more qubits located at a first quantum computing device are to be relocated. The computer-executable instructions additionally cause the processor device to, responsive to the determining, relocate the one or more qubits from the first quantum computing device to a second quantum computing device. The computer-executable instructions further cause the processor device to update one or more qubit registry records corresponding to the one or more qubits to indicate that the one or more qubits have been relocated to the second quantum computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is a block diagram illustrating constituent elements of relocation rules of the qubit relocation service of FIG. 1, according to some examples;

DETAILED DESCRIPTION

Figure 1:
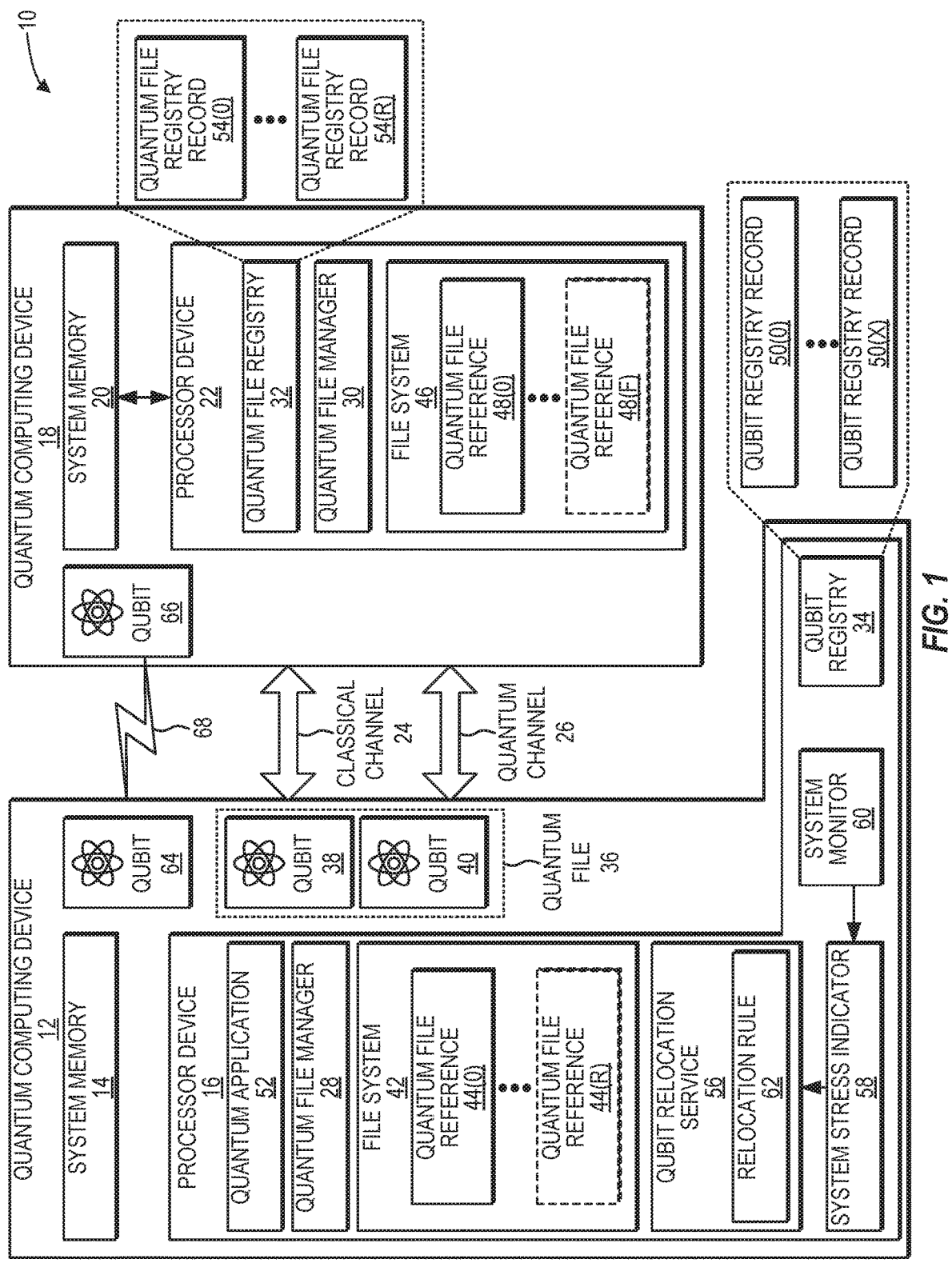
FIG. 1 is a block diagram of a quantum computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," each of which has properties (such that superposition and entanglement) that differ from those of classical (i.e., non-quantum) bits used in classical computing. As quantum computing continues to increase in popularity and become more commonplace, an ability to react to adverse operating conditions that may jeopardize a quantum computing device's ability to maintain qubits will be desirable.

The examples disclosed herein implement a quantum file management system that performs automatic qubit relocation. A qubit relocation service, executing on a processor device of a first quantum computing device, receives a system stress indicator from a system monitor that tracks a status of the first quantum computing device and/or a status of qubits maintained by the first quantum computing device. The system stress indicator may include, as non-limiting examples, an indication of a state of the first quantum computing device itself (e.g., system load, system response time, operating temperature, and/or the like), an indication of a state of the qubits maintained by the first quantum computing device (e.g., qubit age, coherence time, and/or the like), and/or an indication of any other condition that may adversely affect the ability of the first quantum computing device to maintain its qubits in a usable state.

The qubit relocation service applies a relocation rule to the system stress indicator to determine whether one or more qubits located at the first quantum computing device are to be relocated. As a non-limiting example, the relocation rule may specify an acceptable operating temperature for the first quantum computing device, and the qubit relocation service may apply the relocation rule to a current operating temperature indicated by the system stress indicator to determine whether the current operating temperature exceeds the acceptable operating temperature. If it is determined that the one or more qubits are to be relocated, the qubit relocation service automatically relocates the one or more qubits from the first quantum computing device to a second quantum computing device. Relocating the one or more qubits may be accomplished in some examples by physically transporting the qubits from the first quantum computing device to the second quantum computing device via a quantum channel, or by teleporting the qubits from the first quantum computing device to the second quantum computing device using pairs of entangled qubits. The qubit relocation service also updates qubit registry records for the one or more qubits to indicate that the one or more qubits have been relocated.

FIG. 1 is a block diagram of a quantum computing system 10 according to one example. The quantum computing system 10 includes a quantum computing device 12 that comprises a system memory 14 and a processor device 16, and also includes a quantum computing device 18 that includes a system memory 20 and a processor device 22. It is to be understood that the quantum computing system 10 according to some examples may include other classical computing devices and/or additional quantum computing devices that are not illustrated in FIG. 1. Additionally, the quantum computing device 12 and the quantum computing device 18 in some examples may include constituent elements in addition to those illustrated in FIG. 1.

The quantum computing device 12 and the quantum computing device 18 may be close in physical proximity to one another, or may be relatively long distances from one another (e.g., hundreds or thousands of miles from one another). The quantum computing device 12 and the quantum computing device 18 operate in quantum environments, but can operate using classical computing principles or quantum computing principles. When using quantum computing principles, the quantum computing device 12 and the quantum computing device 18 perform computations that utilize quantum-mechanical phenomena, such as superposition and/or entanglement states. The quantum computing device 12 and the quantum computing device 18 each may operate under certain environmental conditions, such as at or near zero degrees (0°) Kelvin. When using classical computing principles, the quantum computing device 12 and the quantum computing device 18 utilize binary digits that have a value of either zero (0) or one (1). In the example of FIG. 1, the quantum computing device 12 and the quantum computing device 18 are communicatively coupled via a classical channel 24 (e.g., a conventional network connection), and are also communicatively coupled via a quantum channel 26 over which particles that embody qubits may be transmitted. Thus, for example, qubits may be physically transported between the quantum computing device 12 and the quantum computing device 18 via the quantum channel 26.

The quantum computing device 12 and the quantum computing device 18 of FIG. 1 together implement a quantum file management system, components of which are distributed among one or more of the quantum computing device 12 and the quantum computing device 18. The quantum file management system includes quantum file managers 28 and 30, which operate to implement quantum files on the quantum computing device 12 and the quantum computing device 18, respectively. The quantum file management system also includes a quantum file registry 32 that includes metadata regarding each quantum file implemented in the quantum computing system 10, as well as a qubit registry 34 that includes metadata regarding each qubit implemented in the quantum computing system 10. The quantum file registry 32 and the qubit registry 34 are each discussed in greater detail below.

In the example of FIG. 1, the quantum computing system 10 implements a quantum file 36 that is made up of two (2) qubits 38 and 40 that that are hosted on the quantum computing device 12. For purposes of this example, the quantum file 36 is "owned" by the quantum computing device 12. However, it is to be understood that ownership of the quantum file 36 and its constituent qubits 38 and 40 may be migrated or transitioned from one quantum computing device to another. It is to be further understood that the quantum file 36 in some examples may comprise more qubits than illustrated in FIG. 1.

The quantum computing device 12 includes a file system 42 that includes one or more quantum file references 44(0)-44(R). Each of the quantum file references 44(0)-44(R) corresponds to a quantum file that is maintained in the quantum file registry 32 and that is "owned" by the quantum computing device 12. Thus, for example, the quantum file reference 44(0) may correspond to the quantum file 36. Likewise, the quantum computing device 18 includes a file system 46 that includes one or more quantum file references 48(0)-48(F). It is to be understood that the file system 46 provides functionality corresponding to the functionality of the file system 42 described herein.

As noted above, the quantum computing system 10 also includes the qubit registry 34, with which the quantum file manager 28 may communicate via any suitable inter-process communications mechanism (e.g., an application programming interface (API) or the like). The qubit registry 34 maintains information regarding qubits such as the qubits 38 and 40, including, by way of non-limiting example, a total qubits counter (not shown) via which the total number of qubits implemented by the quantum computing system 10 may be tracked, a total available qubits counter (not shown) via the total number of qubits that are currently available for allocation may be tracked, and a qubit partition structure (not shown) that may be used to implement qubit partitions. The qubit registry 34 also includes a plurality of qubit registry records 50(0)-50(X), each of which maintains information about a corresponding qubit such as the qubits 38 and 40. Each of the qubit registry records 50(0)-50(X) may include, as non-limiting examples, an identifier of the corresponding qubit, a quantum service identifier of a quantum service currently using the corresponding qubit, a location of the corresponding qubit, an indicator of a entanglement state, a superposition state, and/or a superdense state of the corresponding qubit, or the like.

In exemplary operation, a quantum file such as the quantum file 36 may be accessed by a requestor (e.g., a quantum application 52) via the quantum file reference 44(0), which is identified by the quantum application 52 via an identifier (not shown). The quantum application 52 provides the identifier to the quantum file manager 28 via any suitable inter-process communications mechanism, such as an API or the like. In some examples, the quantum file manager 28 may be an integral part of a quantum operating system, and the appropriate intercommunication mechanisms between the quantum application 52 and the quantum file manager 28 may be generated in response to certain programming instructions, such as reading, writing, or otherwise accessing the quantum file 36 while the quantum application 52 is being compiled.

The quantum file manager 28 then accesses the file system 42. Based on the quantum file identifier provided by the quantum application 52, the quantum file manager 28 accesses the quantum file reference 44(0). The quantum file reference 44(0) includes information about the quantum file 36, such as an owner of the quantum file 36, an internal quantum file identifier for the quantum file 36, a location of a Quantum Assembly Language (QASM) file that contains programming instructions that access the quantum file 36, and/or metadata for the quantum file 36 (e.g., a creation timestamp of the quantum file 36, a last modification timestamp of the quantum file 36, and/or a current user of the quantum file 36, as non-limiting examples). The quantum file reference 44(0) may also identify each qubit that makes up the quantum file 36 (i.e., the qubits 38 and 40, in this example).

In some examples, data may be spread over the qubits 38 and 40 of the quantum file 36 in a manner that dictates that the qubits 38 and 40 must be accessed in some sequential order for the data to have contextual meaning. Accordingly, some examples may provide that the order in which the qubits 38 and 40 are identified in the quantum file reference 44(0) may correspond to the appropriate order in which the qubits 38 and 40 should be accessed. In other examples, the quantum file reference 44(0) may have one or more additional fields identifying the appropriate order. Some examples may also provide that the quantum file reference 44(0) includes qubit entanglement indicators that indicate entanglement status information about the qubits 38 and 40, quantum superposition indicators that indicate superposition status information about the qubits 38 and 40, and/or superdense indicators that indicate superdense status information about the qubits 38 and 40.

In the example of FIG. 1, the quantum file manager 28, upon receiving an access request to a quantum file such as the quantum file 36, may access the quantum file registry 32 (using, e.g., a linking service (not shown)) to determine a current status of the quantum file 36. The quantum file registry 32 of FIG. 1 comprises a plurality of quantum file registry records 54(0)-54(R), each of which corresponds to a quantum file implemented in the quantum computing system 10. In this example, the quantum file registry record 54(0) corresponds to the quantum file 36.

The quantum file registry records 54(0)-54(R) include current metadata regarding the corresponding quantum files. The metadata may include, as non-limiting examples, an owner of each corresponding quantum file, an internal file identifier of each corresponding quantum file, an indicator of a number of qubits that make up the corresponding quantum file, and, for each qubit of the number of qubits, a qubit identifier field. The quantum file registry records 54(0)-54(R) each may also include additional metadata, such as, by way of non-limiting example, a creation timestamp of the corresponding quantum file, a last modification timestamp of the corresponding quantum file, a current user (e.g., current quantum application or current quantum service) of the corresponding quantum file, and the like. Some examples may also provide that the quantum file registry records 54(0)-54(R) each further include qubit entanglement status fields, quantum superposition status fields, and/or superdense status fields for each qubit of the corresponding quantum file.

The quantum file manager 28 updates the quantum file reference 44(0) with the information from the quantum file registry record 54(0) and the outcome of any checks, and also updates the timestamp field of the quantum file reference 44(0) with the current time. The quantum file manager 28 then returns control to the quantum application 52, passing the quantum application 52 at least some of the updated information contained in the quantum file reference 44(0). The quantum application 52 may then initiate actions against the qubits 38 and 40, such as read actions, write actions, or the like.

One function provided by the quantum computing system 10 of FIG. 1 is automatic relocation of qubits, such as the qubits 38 and 40, if the quantum computing device 12 and/or the qubits 38 and 40 themselves exhibits signs of stress indicating that the quantum computing device 12 may lose the ability to effectively maintain the qubits 38 and 40. Accordingly, in the example of FIG. 1, the quantum computing device 12 implements a qubit relocation service 56 that provides functionality for automatically relocating the qubits 38 and 40. The qubit relocation service 56 is executed by the processor device 16, and receives a system stress indicator 58 from a system monitor 60 of the quantum computing device 12. The system monitor 60 tracks a status of the quantum computing device 12 and/or a status of the qubits 38 and 40 maintained by the quantum computing device 12. In some examples, the system monitor 60 comprises a process executed by the processor device 16, while some examples may provide that the system monitor 60 represents a sensor or other hardware that provides data to the processor device 16. It is to be understood that, while the system monitor 60 is illustrated in FIG. 1 as an integral element of the processor device 16, some examples may provide the system monitor 60 as an element separate from and/or external to the processor device 16.

The system stress indicator 58 may comprise an indication of any operating or environmental condition that may affect the ability of the quantum computing device 12 to maintain the qubits 38 and 40 in a usable state. Thus, according to some examples, the system stress indicator 58 may include an indication of a state of the quantum computing device 12 itself, such as a system load indication, a system response time indication, an operating temperature indication, and/or the like, as non-limiting examples. Some examples may provide that the system stress indicator 58 comprises an indication of a state of the qubits 38 and 40 maintained by the quantum computing device 12, such as a qubit age indication, a coherence time indication, and/or the like, as non-limiting examples.

Upon receiving the system stress indicator 58, the qubit relocation service 56 applies a relocation rule 62 to the system stress indicator 58 to determine whether the qubits 38 and 40 maintained by the quantum computing device 12 are to be relocated (e.g., to the quantum computing device 18). The relocation rule 62 quantifies conditions that, when met, will trigger relocation of the qubits 38 and 40 to the quantum computing device 18 by the qubit relocation service 56. As discussed in greater detail below with respect to FIG. 2, the relocation rule 62 according to some examples may be one of a plurality of relocation rules that are ranked and applied in sequence to the system stress indicator 58. In addition to the relocation rule 62 that triggers relocation of the qubits 38 and 40, the qubit relocation service 56 in some examples may also comprise rules that specify conditions that, when met, will trigger actions to prepare for relocation of the qubits 38 and 40 (e.g., preparing the quantum channel 26, as a non-limiting example) without actually performing relocation of the qubits 38 and 40.

Based on the system stress indicator 58 and the relocation rule 62, the qubit relocation service 56 determines that the qubits 38 and 40 are to be relocated from the quantum computing device 12 to the quantum computing device 18. For instance, the relocation rule 62 may specify a maximum temperature threshold for the quantum computing device 12, and the qubit relocation service 56, in applying the relocation rule 62 to a temperature reading provided by the system stress indicator 58, may determine that a current operating temperature of the quantum computing device 12 exceeds the maximum temperature threshold specified by the relocation rule 62. In some examples, the qubit relocation service 56 may also identify a quantum computing device, such as the quantum computing device 18, as a destination quantum computing device for relocating the qubits 38 and 40. The quantum computing device 18 may be identified as the destination quantum computing device based on factors such as a location of the quantum computing device 18, a distance between the quantum computing device 12 and the quantum computing device 18, and/or a shortest route between the quantum computing device 12 and the quantum computing device 18. Some examples may provide that the relocation rule 62 itself specifies the quantum computing device 18 as the destination quantum computing device.

The qubit relocation service 56 then relocates the qubits 38 and 40 from the quantum computing device 12 to the quantum computing device 18. In some examples, relocating the qubits 38 and 40 may entail physically transporting the qubits 38 and 40 from the quantum computing device 12 to the quantum computing device 18 via the quantum channel 26. For instance, the quantum channel 26 may comprise a fiber optic cable through which photons embodying the qubits 38 and 40 may be transported from the quantum computing device 12 to the quantum computing device 18.

Some examples may provide that relocating the qubits 38 and 40 includes teleporting the qubits 38 and 40 using one or more pairs of entangled qubits maintained by the quantum computing device 12 and the quantum computing device 18. In the example of FIG. 1, the quantum computing device 12 maintains a qubit 64 that is in an entangled state with a corresponding qubit 66 maintained by the quantum computing device 18, as indicated by element 68. As used herein, "teleportation" refers to a process in which the entangled pair of qubits 64 and 66 may be used to transmit quantum state information for a payload qubit (e.g., one of the qubits 38 and 40) from one location to another, without having to transmit the payload qubit's underlying particle. To perform teleportation of a payload qubit such as the qubit 38 in some examples, a Bell measurement operation is performed at the quantum computing device 12 using the qubit 38 and the entangled qubit 64. The Bell measurement operation on the qubit 38 and the entangled qubit 64 results in one (1) of four (4) measurement outcomes and, due to the state of entanglement existing between the qubit 64 and the qubit 66, also leaves the qubit 66 in one (1) of four (4) possible states.

The Bell measurement outcome is subsequently encoded using two (2) classical bits of information, which are then transmitted from the quantum computing device 12 to the quantum computing device 18 via the classical channel 24. Based upon the two (2) classical bits encoding the measurement outcome, the quantum computing device 18 may modify the entangled qubit 66 to result in a qubit that is identical to the qubit 38. In this manner, the qubit 38 can be "teleported" from the quantum computing device 12 to the quantum computing device 18, without having to physically transport the particle embodying the qubit 38.

After relocating the qubits 38 and 40 to the quantum computing device 18, the qubit relocation service 56 updates corresponding qubit registry records among the qubit registry records 50(0)-50(X) to indicate that the qubits 38 and 40 have been relocated to the quantum computing device 18. In some examples, the qubit relocation service 56 may also update a quantum file registry record, such as the quantum file registry record 54(0) corresponding to the quantum file 36, to indicate that the qubits 38 and 40 have been relocated to the quantum computing device 18.

To illustrate constituent elements of relocation rules, such as the relocation rule 62 of the qubit relocation service 56 of FIG. 1, according to some examples, FIG. 2 is provided. In FIG. 2, a qubit relocation service 70, corresponding in functionality to the qubit relocation service 56 of FIG. 1, is shown. The qubit relocation service 70 of FIG. 2 includes a plurality of relocation rules 72(0)-72(N). Each of the relocation rules 72(0)-72(N) specifies a set of conditions that, when met, may trigger relocation of qubits maintained by a quantum computing device such as the quantum computing device 12 of FIG. 1. In the example of FIG. 2, the relocation rules 72(0)-72(N) each includes a respective rule rank 74(0)-74(N) that indicates a relative rank of the corresponding relocation rule 72(0)-72(N). When applying the relocation rules 72(0)-72(N) to a system stress indicator (e.g., the system stress indicator 58 of FIG. 1), the qubit relocation service 70 may apply the relocation rules 72(0)-72(N) sequentially in an order indicated by the rule ranks 74(0)-74(N), or may employ the rule ranks 74(0)-74(N) to identify a most appropriate relocation rule 72(0)-72(N) to apply.

The relocation rules 72(0)-72(N) of FIG. 2 also include respective system attributes 76(0)-76(N) and relocation thresholds 78(0)-78(N). The system attributes 76(0)-76(N) each specify an attribute of a quantum computing device (e.g., system load, system response time, operating temperature, and/or the like, as non-limiting examples) and/or an attribute of qubits maintained by the quantum computing device (e.g., qubit age, coherence time, and/or the like, as non-limiting examples) that may be compared with the corresponding relocation threshold 78(0)-78(N) to determine whether qubits are to be relocated. The relocation rules 72(0)-72(N) of FIG. 2 further include destination quantum computing device identifiers 80(0)-80(N), each of which identifies a quantum computing device to which qubits may be relocated if the corresponding relocation rule 72(0)-72(N) is triggered.

It is to be understood that the relocation rules 72(0)-72(N) of FIG. 2 in some examples may include more, fewer, or different elements in place of or in addition to the elements illustrated in FIG. 2. It is to be further understood that, while FIG. 2 shows the relocation rules 72(0)-72(N) as an integral element of the qubit relocation service 70, in some examples the relocation rules 72(0)-72(N) may be embodied as data structures or devices external to the qubit relocation service 70.

Figure 3A:
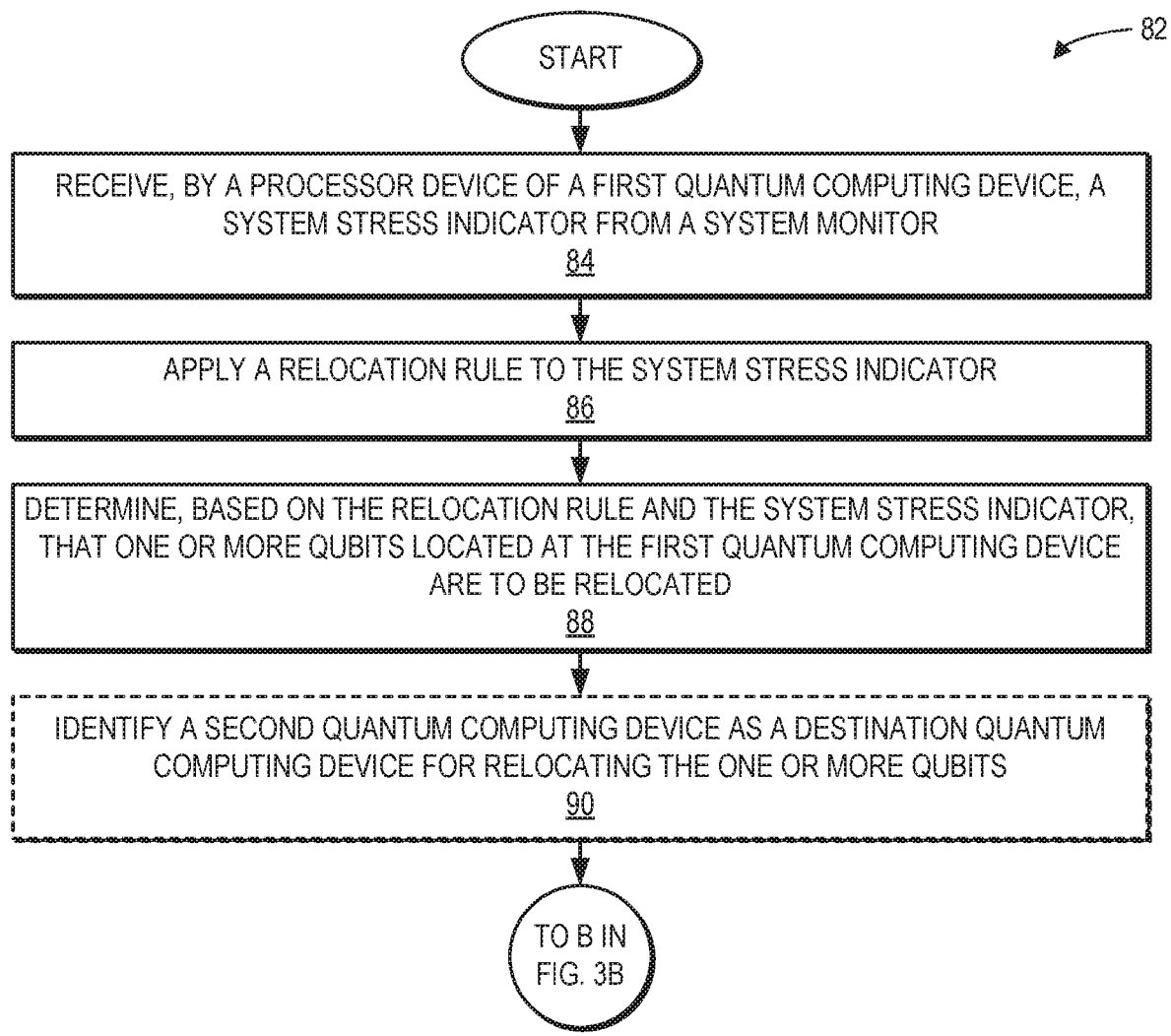
FIGS. 3A and 3B are flowcharts illustrating operations for performing automatic qubit relocation, according to one example.
Figure 3B:
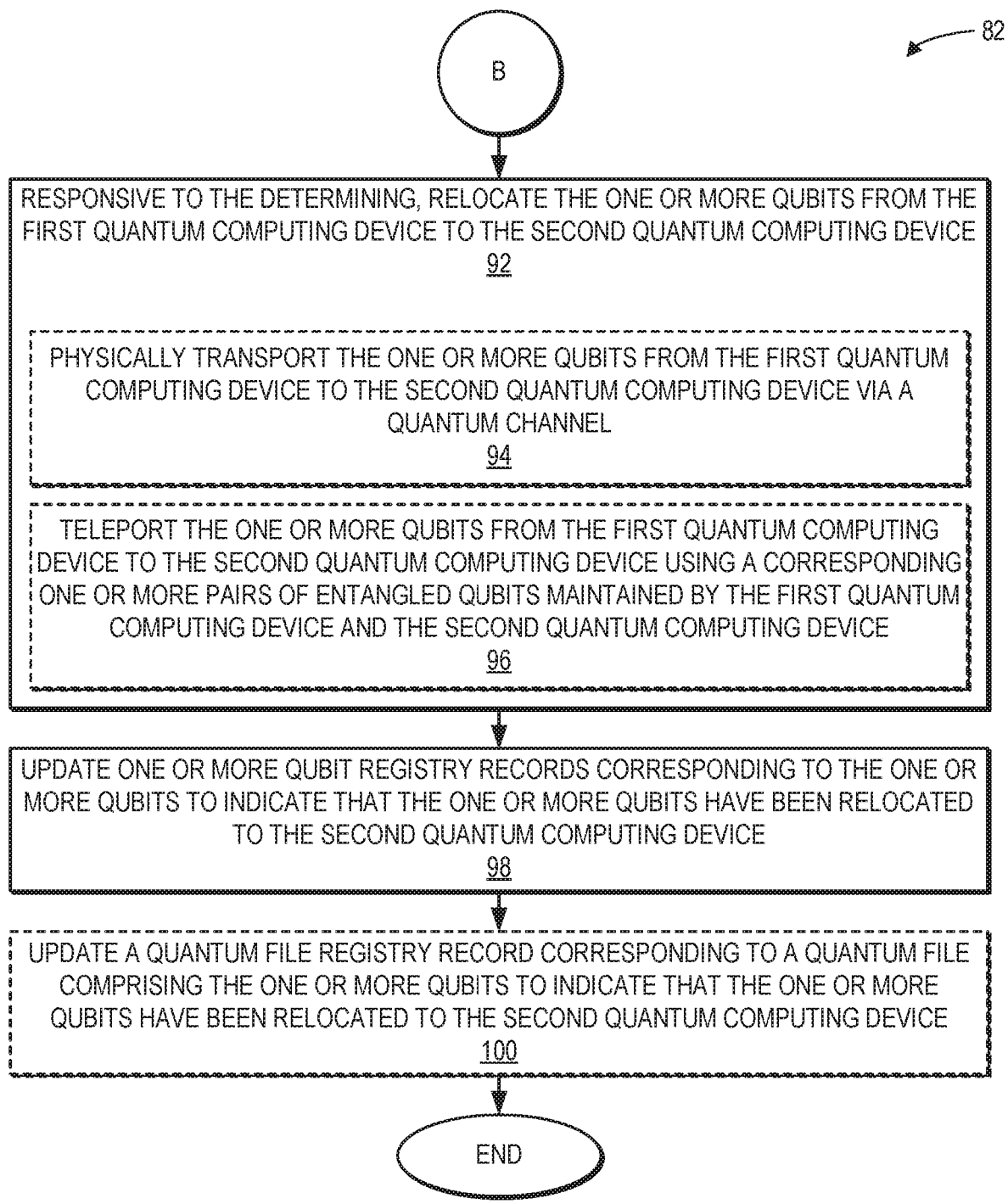

FIGS. 3A and 3B provide a flowchart 82 showing exemplary operations for performing automatic qubit relocation, according to some examples. For the sake of clarity, elements of FIG. 1 are referenced in describing FIGS. 3A and 3B. Operations in FIG. 3A begin with a processor device of a first quantum computing device (e.g., the processor device 16 of the quantum computing device 12 ("first quantum computing device 12") executing the qubit relocation service 56 of FIG. 1) receiving the system stress indicator 58 from the system monitor 60 (block 84). The qubit relocation service 56 next applies the relocation rule 62 to the system stress indicator 58 (block 86). Based on the relocation rule 62 and the system stress indicator 58, the qubit relocation service 56 determines that one or more qubits located at the first quantum computing device 12, such as the qubits 38 and 40, are to be relocated (block 88). In some examples, the qubit relocation service 56 may also identify a second quantum computing device (such as the quantum computing device 18 ("second quantum computing device 18")), as a destination quantum computing device for relocating the one or more qubits 38 and 40 (block 90). Processing then continues at block 92 of FIG. 3B.

Referring now to FIG. 3B, the qubit relocation service 56, responsive to the determining, relocates the one or more qubits 38 and 40 from the first quantum computing device 12 to the second quantum computing device 18 (block 92). According to some examples, the operations of block 92 for relocating the one or more qubits 38 and 40 may comprise physically transporting the one or more qubits 38 and 40 from the first quantum computing device 12 to the second quantum computing device 18 via the quantum channel 26 (block 94). Some examples may provide that the operations of block 92 for relocating the one or more qubits 38 and 40 may comprise teleporting the one or more qubits 38 and 40 from the first quantum computing device 12 to the second quantum computing device 18 using a corresponding one or more pairs of entangled qubits maintained by the first quantum computing device 12 and the second quantum computing device 18 (such as the qubits 64 and 66) (block 96).

The qubit relocation service 56 then updates one or more qubit registry records, such as the qubit registry records 50(0)-50(X), corresponding to the one or more qubits 38 and 40 to indicate that the one or more qubits 38 and 40 have been relocated to the second quantum computing device 18 (block 98). Some examples may provide that the qubit relocation service 56 also updates a quantum file registry record, such as the quantum file registry record 54(0), corresponding to the quantum file 36 comprising the one or more qubits 38 and 40 to indicate that the one or more qubits 38 and 40 have been relocated to the second quantum computing device 18 (block 100).

Figure 4:
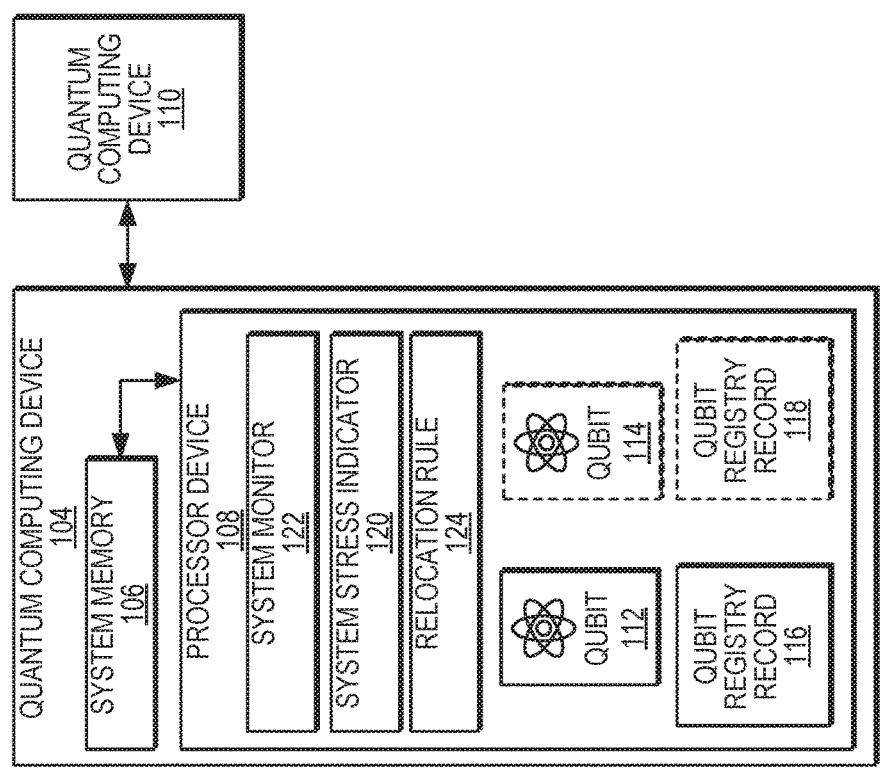
FIG. 4 is a simpler block diagram of the quantum computing system of FIG. 1 for performing automatic qubit relocation, according to one example.

FIG. 4 is a simpler block diagram of the quantum computing system 102 of FIG. 1 for performing automatic qubit relocation, according to one example. In the example of FIG. 4, a quantum computing system 102 includes a quantum computing device 104 that comprises a system memory 106 and a processor device 108, and also includes a quantum computing device 110. The quantum computing system 102 includes two (2) qubits 112 and 114 that that are hosted on the quantum computing device 104, and also includes qubit registry records 116 and 118 that store metadata corresponding to the qubits 112 and 114.

To automatically relocate the qubits 112 and 114, the processor device 108 receives a system stress indicator 120 from a system monitor 122 of the quantum computing device 104. Upon receiving the system stress indicator 120, the processor device 108 applies a relocation rule 124 to the system stress indicator 120 to determine whether the qubits 112 and 114 maintained by the quantum computing device 104 are to be relocated (e.g., to the quantum computing device 110). Based on the system stress indicator 120 and the relocation rule 124, the processor device 108 determines that the qubits 112 and 114 are to be relocated from the quantum computing device 104 to the quantum computing device 110. The processor device 108 then relocates the qubits 112 and 114 from the quantum computing device 104 to the quantum computing device 110. After relocating the qubits 112 and 114 to the quantum computing device 110, the processor device 108 updates corresponding qubit registry records among the qubit registry records 116 and 118 to indicate that the qubits 112 and 114 have been relocated to the quantum computing device 110.

Figure 5:
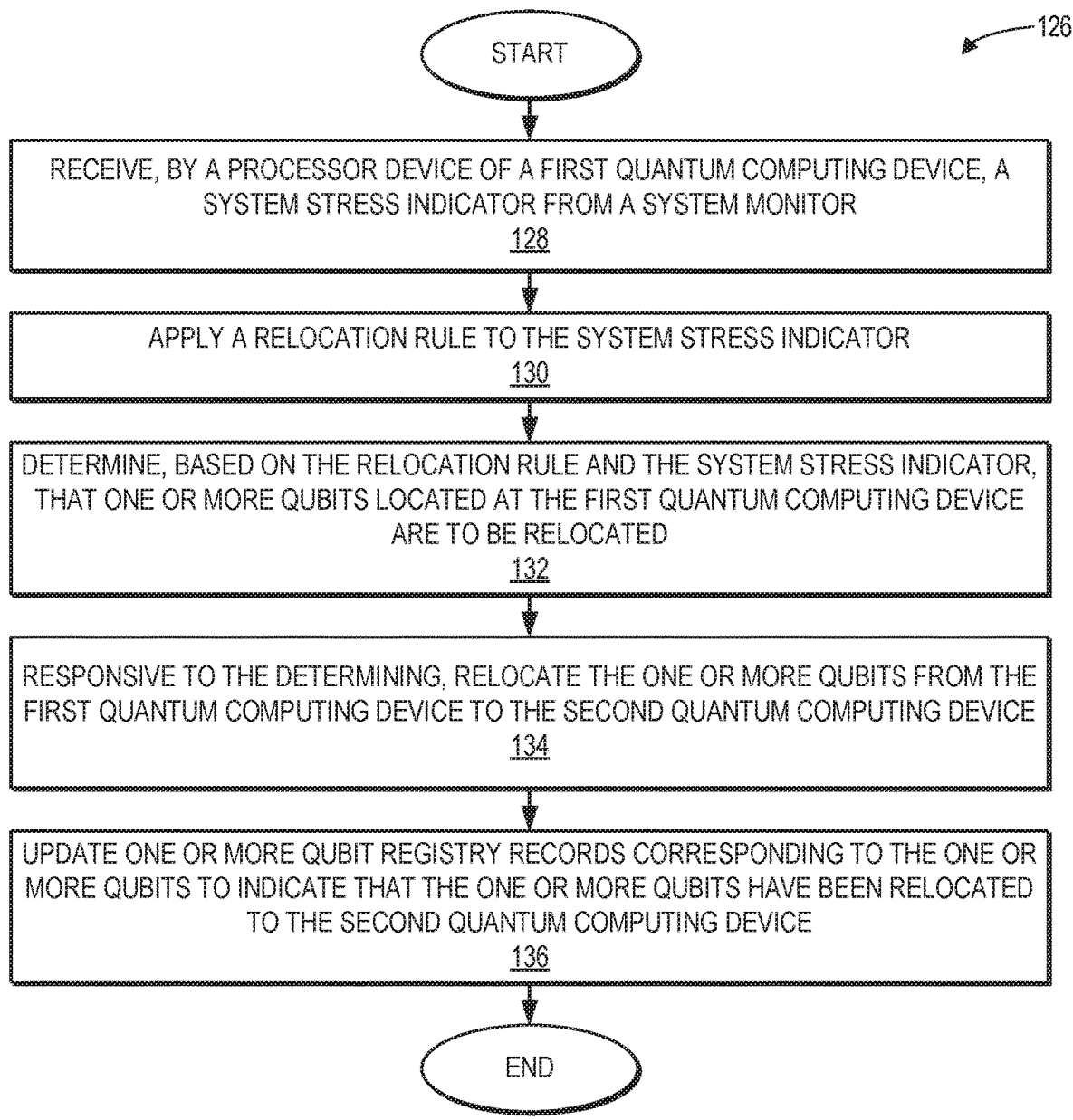
FIG. 5 is a flowchart of a simplified method for performing automatic qubit relocation in the quantum computing system of FIG. 4, according to one example.

FIG. 5 provides a flowchart 126 of a simplified method for providing a quantum file permission system in the quantum computing system 102 of FIG. 4, according to one example.

For the sake of clarity, elements of FIG. 4 are referenced in describing FIG. 5. In FIG. 5, operations begin with a processor device of a first quantum computing device (e.g., the processor device 108 of the quantum computing device 104 ("first quantum computing device 104")) receiving the system stress indicator 120 from the system monitor 122 (block 128). The processor device 108 applies a relocation rule 124 to the system stress indicator 120 (block 130). The processor device 108 then determines, based on the relocation rule 124 and the system stress indicator 120, that one or more qubits, such as the qubits 112 and 114, located at the first quantum computing device 104 are to be relocated (block 132). Responsive to the determining, the processor device 108 relocates the one or more qubits 112 and 114 from the first quantum computing device 104 to a second quantum computing device, such as the quantum computing device 110 ("second quantum computing device 110") (block 134). The processor device 108 then updates one or more qubit registry records, such as the qubit registry records 116 and 118, corresponding to the one or more qubits 112 and 114 to indicate that the one or more qubits 112 and 114 have been relocated to the second quantum computing device 110 (block 136).

Figure 6:
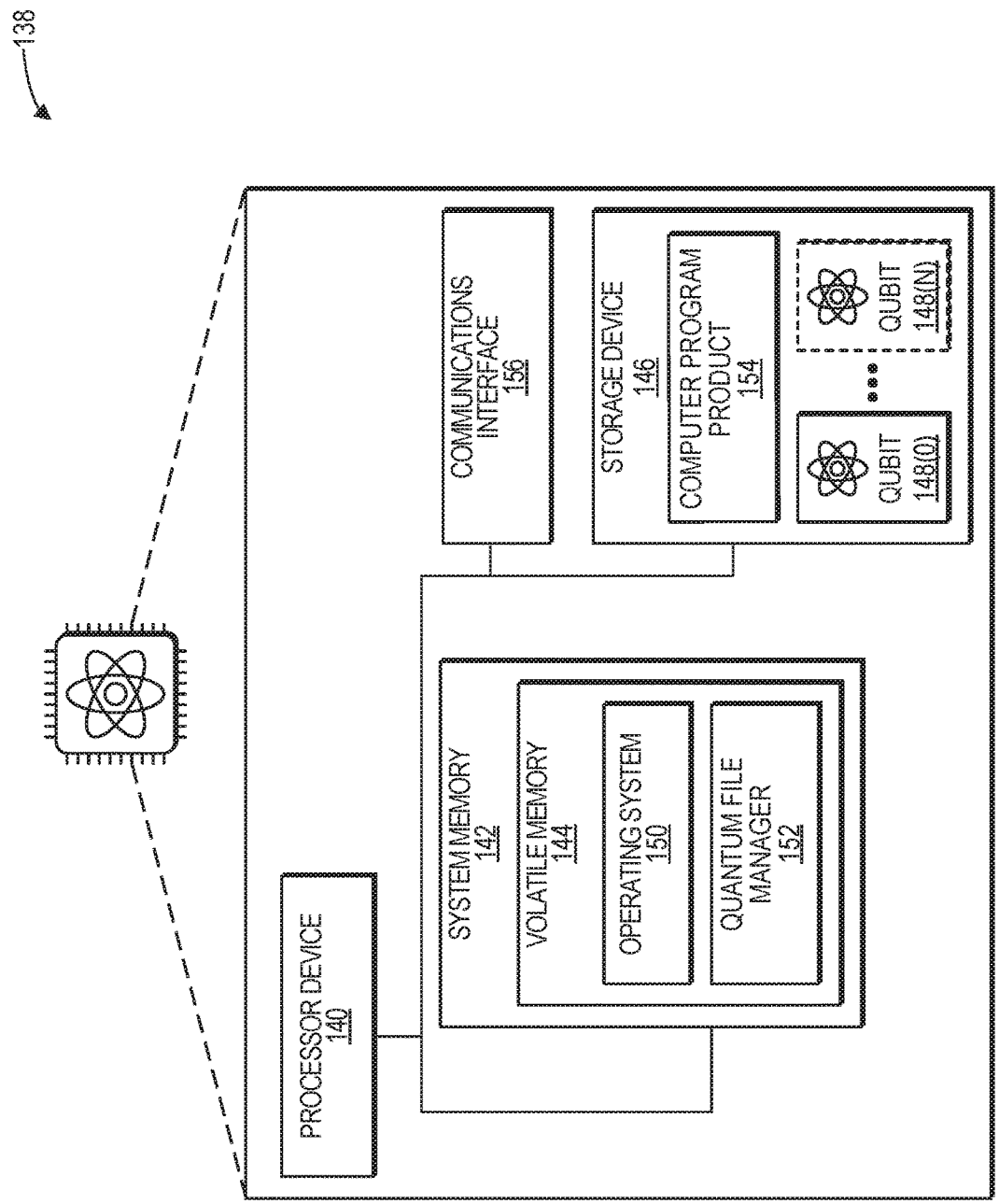
FIG. 6 is a block diagram of a quantum computing device suitable for implementing examples, according to one example.

FIG. 6 is a block diagram of a quantum computing device 138, such as the quantum computing device 12 and the quantum computing device 18 of FIG. 1, suitable for implementing examples according to one example. The quantum computing device 138 may comprise any suitable quantum computing device or devices. The quantum computing device 138 can operate using classical computing principles or quantum computing principles. When using quantum computing principles, the quantum computing device 138 performs computations that utilize quantum-mechanical phenomena, such as superposition and entanglement. The quantum computing device 138 may operate under certain environmental conditions, such as at or near zero degrees) (0°) Kelvin. When using classical computing principles, the quantum computing device 138 utilizes binary digits that have a value of either zero (0) or one (1).

The quantum computing device 138 includes a processor device 140 and a system memory 142. The processor device 140 can be any commercially available or proprietary processor suitable for operating in a quantum environment. The system memory 142 may include volatile memory 144 (e.g., random-access memory (RAM)). The quantum computing device 138 may further include or be coupled to a non-transitory computer-readable medium such as a storage device 146, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 146 and other drives associated with computer-readable media and computer-usable media may provide non-volatile storage of data, data structures, computer-executable instructions, and the like. The storage device may also provide functionality for storing one or more qubits 148(0)-148(N).

A number of modules can be stored in the storage device 146 and in the volatile memory 144, including an operating system 150 and one or more modules, such as a quantum file manager 152. All or a portion of the examples may be implemented as a computer program product 154 stored on a transitory or non-transitory computer-usable or computer-readable medium, such as the storage device 146, which includes computer-executable instructions, such as complex computer-readable program code, to cause the processor device 140 to carry out the steps described herein. Thus, the computer-readable program code can comprise software instructions for implementing the functionality of the examples described herein when executed on the processor device 140. An operator may also be able to enter one or more configuration commands through a keyboard (not illustrated), a pointing device such as a mouse (not illustrated), or a touch-sensitive surface such as a display device. The quantum computing device 138 may also include a communications interface 156 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
  receiving, by a first processor device of a first quantum computing device comprising a first memory, a system stress indicator from a system monitor, wherein the system stress indicator is indicative of a condition that may adversely affect an ability of the first quantum computing device to maintain one or more qubits located at the first quantum computing device in a usable state;
  applying a relocation rule to the system stress indicator;
  determining, based on the relocation rule and the system stress indicator, that the one or more qubits are to be relocated;
  responsive to the determining, relocating the one or more qubits from the first quantum computing device to a second quantum computing device that is a different quantum computing device than the first quantum computing device, wherein the second quantum computing device comprises a second processor device and a second memory;
  updating a location field in each of one or more qubit registry records corresponding to the one or more qubits to indicate that the one or more qubits have been relocated to the second quantum computing device; and
  updating a quantum file registry record corresponding to a quantum file comprising the one or more qubits to indicate that the one or more qubits have been relocated to the second quantum computing device, wherein the quantum file registry record is a different record than the one or more qubit registry records, wherein the quantum file registry record comprises:
    a plurality of qubit identifiers of a plurality of qubits of the quantum file; and
    data indicative of a sequential order in which the plurality of qubits of the quantum file are to be accessed when accessing the quantum file.

2. The method of claim 1, wherein relocating the one or more qubits comprises physically transporting the one or more qubits from the first quantum computing device to the second quantum computing device via a quantum channel.

3. The method of claim 1, wherein relocating the one or more qubits comprises teleporting the one or more qubits from the first quantum computing device to the second quantum computing device using a corresponding one or more pairs of entangled qubits maintained by the first quantum computing device and the second quantum computing device.

4. The method of claim 1, wherein the system stress indicator comprises one or more of an indication of a state of the first quantum computing device and an indication of a state of the one or more qubits.

5. The method of claim 1, further comprising, prior to relocating the one or more qubits, identifying the second quantum computing device as a destination quantum computing device for relocating the one or more qubits.

6. The method of claim 5, wherein identifying the second quantum computing device as the destination quantum computing device is based on one or more of a location of the second quantum computing device, a distance between the first quantum computing device and the second quantum computing device, and a shortest route between the first quantum computing device and the second quantum computing device.

7. The method of claim 5, wherein:
the relocation rule specifies the second quantum computing device as the destination quantum computing device for relocating the one or more qubits; and
identifying the second quantum computing device as the destination quantum computing device is based on the relocation rule.

8. The method of claim 1, wherein the relocation rule is one of a plurality of ranked relocation rules applied in sequence to the system stress indicator.

9. A quantum computing system, comprising:
a first quantum computing device comprising:
a first system memory; and
at least one first processor device coupled to the first system memory to:
receive a system stress indicator from a system monitor, wherein the system stress indicator is indicative of a condition that may adversely affect an ability of the first quantum computing device to maintain one or more qubits located at the first quantum computing device in a usable state;
apply a relocation rule to the system stress indicator;
determine, based on the relocation rule and the system stress indicator, that the one or more qubits are to be relocated;
responsive to the determining, relocate the one or more qubits from the first quantum computing device to a second quantum computing device that is a different quantum computing device than the first quantum computing device, wherein the second quantum computing device comprises a second processor device and a second memory;
update a location field in each of one or more qubit registry records corresponding to the one or more qubits to indicate that the one or more qubits have been relocated to the second quantum computing device; and
update a quantum file registry record corresponding to a quantum file comprising the one or more qubits to indicate that the one or more qubits have been relocated to the second quantum computing device, wherein the quantum file registry record is a different record than the one or more qubit registry records, wherein the quantum file registry record comprises:
a plurality of qubit identifiers of a plurality of qubits of the quantum file; and
data indicative of a sequential order in which the plurality of qubits of the quantum file are to be accessed when accessing the quantum file.

10. The quantum computing system of claim 9, wherein to relocate the one or more qubits is to physically transport the one or more qubits from the first quantum computing device to the second quantum computing device via a quantum channel.

11. The quantum computing system of claim 9, wherein to relocate the one or more qubits is to teleport the one or more qubits from the first quantum computing device to the second quantum computing device using a corresponding one or more pairs of entangled qubits maintained by the first quantum computing device and the second quantum computing device.

12. The quantum computing system of claim 9, wherein the system stress indicator comprises one or more of an indication of a state of the first quantum computing device and an indication of a state of the one or more qubits.

13. The quantum computing system of claim 9, wherein the at least one first processor device is further to, prior to relocating the one or more qubits, identify the second quantum computing device as a destination quantum computing device for relocating the one or more qubits.

14. The quantum computing system of claim 13, wherein the at least one first processor device is to identify the second quantum computing device as the destination quantum computing device based on one or more of a location of the second quantum computing device, a distance between the first quantum computing device and the second quantum computing device, and a shortest route between the first quantum computing device and the second quantum computing device.

15. The quantum computing system of claim 13, wherein:
the relocation rule specifies the second quantum computing device as the destination quantum computing device for relocating the one or more qubits; and
the at least one first processor device is to identify the second quantum computing device as the destination quantum computing device based on the relocation rule.

16. A non-transitory computer-readable medium having stored thereon computer-executable instructions which, when executed by a first processor device of a first quantum computing device comprising a first memory, cause the first processor device to:
receive a system stress indicator from a system monitor, wherein the system stress indicator is indicative of a condition that may adversely affect an ability of a first quantum computing device to maintain one or more qubits located at the first quantum computing device in a usable state;
apply a relocation rule to the system stress indicator;
determine, based on the relocation rule and the system stress indicator, that the one or more qubits are to be relocated;
responsive to the determining, relocate the one or more qubits from the first quantum computing device to a second quantum computing device that is a different quantum computing device than the first quantum computing device, wherein the second quantum computing device comprises a second processor device and a second memory;
update a location field in each of one or more qubit registry records corresponding to the one or more qubits to indicate that the one or more qubits have been relocated to the second quantum computing device; and
update a quantum file registry record corresponding to a quantum file comprising the one or more qubits to indicate that the one or more qubits have been relocated to the second quantum computing device, wherein the quantum file registry record is a different record than the one or more qubit registry records, wherein the quantum file registry record comprises:

a plurality of qubit identifiers of a plurality of qubits of the quantum file; and data indicative of a sequential order in which the plurality of qubits of the quantum file are to be accessed when accessing the quantum file.

17. The non-transitory computer-readable medium of claim 16, wherein to relocate the one or more qubits is to physically transport the one or more qubits from the first quantum computing device to the second quantum computing device via a quantum channel.

18. The non-transitory computer-readable medium of claim 16, wherein to relocate the one or more qubits is to teleport the one or more qubits from the first quantum computing device to the second quantum computing device using a corresponding one or more pairs of entangled qubits maintained by the first quantum computing device and the second quantum computing device.

* * * * *